(12) United States Patent
Itoh et al.

(10) Patent No.: US 6,360,869 B1
(45) Date of Patent: Mar. 26, 2002

(54) TRANSVERSE CONVEYANCE APPARATUS FOR ROLLER CONVEYORS AND A LIFT DEVICE

(75) Inventors: Kazuo Itoh; Yoichi Morimoto; Toshiyuki Tachibana, all of Hyogo (JP)

(73) Assignee: Itoh Electric Company Limited, Hyogo (JP)

(*) Notice: Subject to any disclaimer, the term of this patent is extended or adjusted under 35 U.S.C. 154(b) by 0 days.

(21) Appl. No.: 09/582,854

(22) PCT Filed: Nov. 29, 1999

(86) PCT No.: PCT/JP99/06669

§ 371 Date: Jul. 5, 2000

§ 102(e) Date: Jul. 5, 2000

(87) PCT Pub. No.: WO00/32504

PCT Pub. Date: Jun. 8, 2000

(30) Foreign Application Priority Data

Nov. 30, 1998 (JP) .......................................... 10-356904

(51) Int. Cl.⁷ .............................................. B65G 47/10
(52) U.S. Cl. .................................................... 198/370.1
(58) Field of Search ...................................... 198/370.1

(56) References Cited

U.S. PATENT DOCUMENTS

| | | | | | |
|---|---|---|---|---|---|
| 4,658,947 | A | * | 4/1987 | Welder | 198/370.1 |
| 4,798,275 | A | * | 1/1989 | Leemkuil et al. | 198/370.1 |
| 5,609,236 | A | * | 3/1997 | Neukam | 198/370.1 |
| 5,743,375 | A | * | 4/1998 | Shyr et al. | 198/370.1 |
| 5,826,699 | A | * | 10/1998 | Trauten | 198/370.1 |
| 5,868,238 | A | * | 2/1999 | Bonnet | 198/370.1 |

OTHER PUBLICATIONS

JP 06 312832 A dated Aug. 11, 1994 (Ito Denki KK) Patent Abstract of Japan, vol. 1995, No. 02, Mar. 31, 1995.

* cited by examiner

*Primary Examiner*—Stephen T. Gordon
*Assistant Examiner*—G. Blankenship
(74) *Attorney, Agent, or Firm*—Wood, Phillips, VanSanten, Clark & Mortimer (57) ABSTRACT

A transverse conveyance apparatus for roller conveyors comprises a frame, a crosswise feeding mechanism mounted to the frame and a lift device for raising and lowering the frame. Each of rotating portions of the crosswise feeding mechanism is of a width freely movable through between two adjacent rollers of the conveyor. The lift device comprises a cylinder, lids closing opposite ends thereof, fixed shafts protruding outwards and longitudinally of the cylinder that is coaxial with said shafts capable of rotating relative to the lids, a motor built in and driving the cylinder to rotate around and relative to the shafts, a reducer built therein, and a resistance unit also built therein and increasing resistance against rotation thereof. Attachment-engaging portions are formed on the respective lids and disposed longitudinally of the cylinder to face outwards so that the portions and the cylinder rotate together. The portions have axes arranged offset with respect to axes of the shafts. The shafts are held in position in and by an immovable part, with the attachment-engaging portions being not only connected to the frame but also capable of rotating relative to the frame.

14 Claims, 11 Drawing Sheets

TRANSVERSE CONVEYANCE APPARATUS FOR ROLLER CONVEYORS AND A LIFT DEVICE

FIELD OF THE INVENTION

The present invention relates to a transverse conveyance apparatus that is disposed in a roller conveyor line for transporting articles in a longitudinal direction, wherein the apparatus is designed to take the articles away from, or deliver them to, the roller conveyor line by transferring said articles transversely thereof.

Further, the present invention relates to a lift device capable of being incorporated in any apparatus that comprises such parts movable up and down as in the transverse conveyance apparatuses adapted to the roller conveyors.

BACKGROUND OF THE INVENTION

Conveyor lines are used for transportation of articles in assembly lines for assembling products of various types and also in certain distributing stations. Generally, each conveyor line consists of a roller conveyor or a belt conveyor for moving the articles thereon longitudinally thereof. A plurality of such conveyor lines are usually arranged lengthwise and crosswise, instead of simply forming only one straight line. An article receiving/delivering apparatus is disposed at any desired point on each conveyor line. By operating the receiving/delivering apparatus, those articles having moved on one conveyor line will leave it to transfer onto another conveyor line. Sequence of such transferring and transporting operations will cause the articles to advance towards and arrive at a desired destination.

Transverse conveyance or feed apparatuses (sometimes called "cross-feeders") that have been known as the article receiving/delivering apparatuses do each comprise unit belt conveyors as main parts respectively interposed between two adjacent rollers forming a roller conveyor line. The transverse conveyance apparatus of this type for moving the articles lying on the conveyor line will deflect them to advance transversely of the conveyor line, as disclosed for instance in Utility Model Laying-Open Gazette Hei. 5-3224 and Patent Laying-Open Gazette Hei. 6-312832.

The known cross-feeder consists of a crosswise feeding mechanism and a lifting mechanism. While the articles on a conveyor line are transported along a main lengthwise conveying line, the upper support plane of the crosswise feeding mechanism will be kept below that of the lengthwise conveying line. If and when the articles are to be taken sideways off the conveyor line or the latter is to be loaded with the articles, a stopper or any appropriate means will operate to hold those articles still above the cross-feeder. The lifting mechanism will then be activated to raise the upper support plane of cross-feeding mechanism above the upper surface of the lengthwise conveying line, to thereby lift the articles. Subsequently, the crosswise feeding mechanism will be turned on so as to transfer those articles onto another conveyor or to receive therefrom those articles.

The Gazette Hei. 6-312832 discloses a motor-installed roller as the drive source for the lifting mechanism that is built in the cross-feeder, wherein the roller comprises a cylindrical member enclosing a motor and a reducer.

Figure 13:
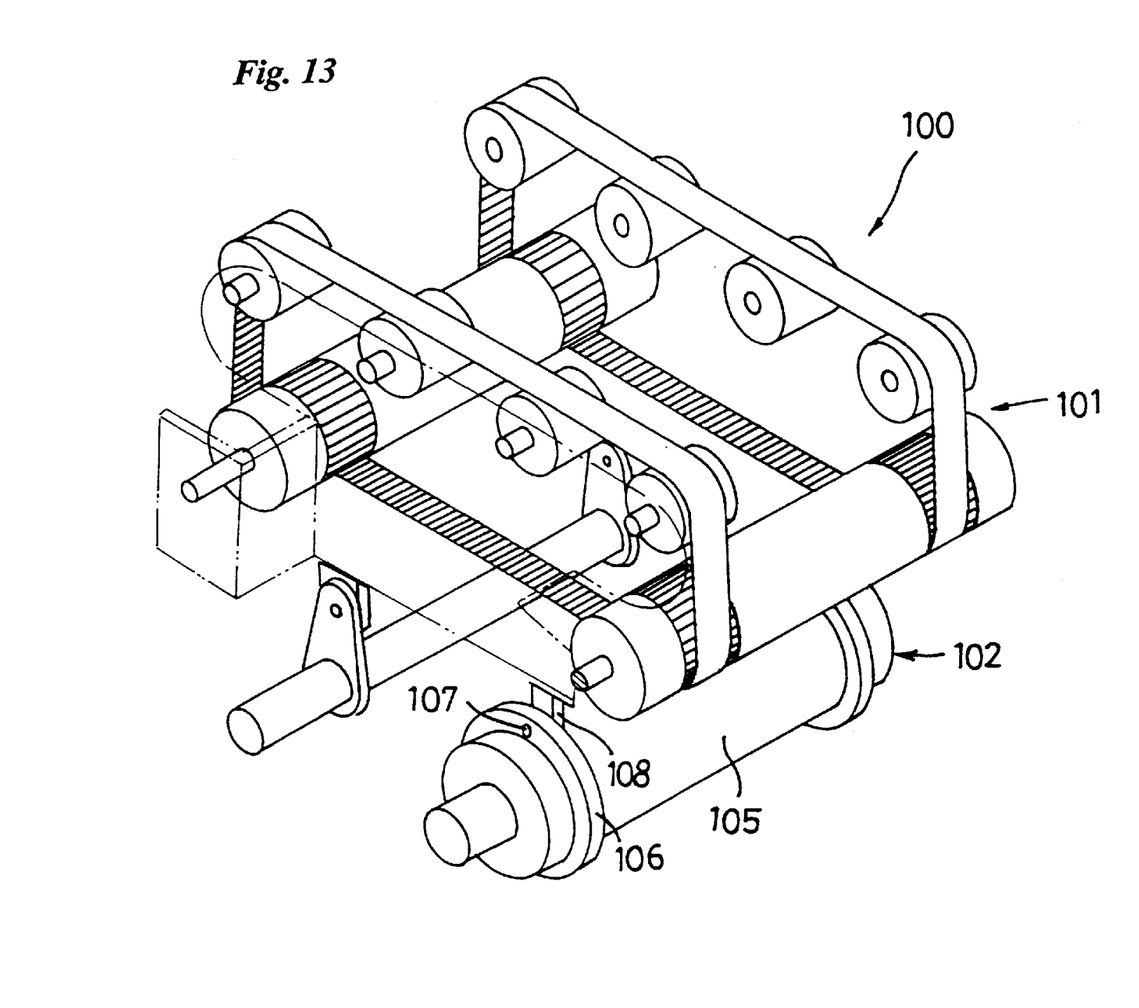
FIG. 13 is a perspective view of one of the prior art transverse conveyance apparatuses.

FIG. 13 is a scheme of the cross-feeder disclosed in the Gazette Hei. 6-312832. This feeder 100 consists of a crosswise feeding mechanism 101 and a lifting mechanism 102, and a motor-installed roller 105 is utilized as the principal member of said mechanism. Rings 106 are attached to the outer peripheral zones of the motor-installed roller 105. A link 108 has its one end connected by a pin 107 to each ring 106, with the other end of the link being connected to the crosswise feeding mechanism 101.

With the pin 107 taking its uppermost position, the crosswise feeding mechanism 101 will have its upper face lifted above the conveying surface of the conveyor line as seen in FIG. 13. When the feeding mechanism 101 has to take refuge from the conveying surface of said line, the motor-installed roller 105 will be turned on to rotate a quarter of a circle so that the pin 107 is put down and said body 101 descends.

The cross-feeder disclosed in the Gazette Hei. 6-321832 has a compact overall size, because its lifting mechanism 102 employs the roller 105 having the motor installed therein.

However, such a prior art cross-feeder 100 is somewhat disadvantageous in that its crosswise feeding mechanism 101 will not necessarily be so stable in its position when raised by the lifting mechanism 102.

In detail, the reducer installed together with the motor in the roller 105 as mentioned above has backlash of a designed degree. Although such backlash causes no problem while the motor is rotating, the cylindrical casing of the roller will become shaky due to the backlash once the motor is inactivated. In general, the reducer accommodated in said roller is of such a structure as to make itself a reverse rotation within a certain angle. Thus, the crosswise feeding mechanism 101 raised in the prior art cross-feeder 100 is not so stable but considerably shaky.

Further, the motor-installed roller 105 in the prior art cross-feeder 100 must repeat to turn forwards and then backwards. This is because the rings 106 integral with the cylindrical casing of said roller are operatively connected by the pins 107 to the crosswise feeding mechanism 101. The lifting mechanism 102 illustrated in FIG. 13 has its links 108 possibly interfering with the roller's 105 cylindrical casing, so that this motor-installed roller cannot rotate 360 degrees. Therefore, in the prior art cross-feeder 100, the roller 105 has to turn about a quarter of a circle in a forward direction to raise the feeding mechanism 101 and then to turn backwards also about a quarter of the circle to lower the crosswise feeding mechanism 101.

As a result, the reducer and other relevant parts in the motor-installed roller 105 tend to become abraded in part, thereby early causing troubles in operation.

In addition, the roller 105 is driven fore and aft an angle of only a quarter of circle in the prior art cross-feeder 100, so that a vertical stroke thus rendered relatively small has been felt unsatisfactory. Further, the rings 106 necessitated in building the prior art feeder has undesirably increased the number of constituent parts thereof.

DISCLOSURE OF THE INVENTION

An object of the present invention is thus to provide a transverse conveyance apparatus not only smaller in size and freer from troubles but also comprising a crosswise feeding mechanism that is much more stabilized in positions thereof. Another object is to provide a lift device designed effective to resolve problems similar to those which have been discussed above.

A transverse conveyance apparatus proposed herein for roller conveyors does comprise a frame, a crosswise feeding mechanism mounted to the frame and a lift device for raising and lowering the frame. The crosswise feeding mechanism has rotating portions, such as pulleys, rollers or conveying belts, so that articles are transported in a direction crossing that in which the articles are to advance on and along the roller conveyor. Each of the rotating portions is of a width freely movable through between two adjacent rollers of the conveyor.

The lift device comprises a cylinder, lids closing opposite ends of the cylinder, fixed shafts protruding outwards and longitudinally of the cylinder that is coaxial with said shafts capable of rotating relative to the lids, a motor built in and driving the cylinder to rotate around and relative to the fixed shafts, a reducer built in the cylinder so as to reduce the motor's rotational speed transmitted thereto, and a resistance unit also built in the cylinder and increasing resistance against rotation of said cylinder.

In the apparatus of the invention, attachment-engaging portions are formed on the respective lids and disposed longitudinally of the cylinder to face outwards so that the attachment-engaging portions and the cylinder do rotate together in unison with each other, the attachment-engaging portions having axes arranged offset with respect to axes of the fixed shafts.

Also in the apparatus of the invention, the fixed shafts are held in position in and by one member selected from the group consisting of the crosswise feeding mechanism and an immovable part, with the attachment-engaging portions being not only connected to the other member selected from said group but also capable of rotating relative to said other member.

In the present invention, the transverse conveyance apparatus utilizes a part similar to the prior art motor-installed roller. Therefore, the apparatus is also compact in its outer configuration.

The lids in the transverse conveyance apparatus have the attachment-engaging portions that are designed to rotate in unison with the cylinder and may typically be located outside it. Those attachment-engaging portions are arranged to be eccentric with respect to the fixed shafts. Either the fixed shafts or the attachment-engaging portions are connected to the cross-wise feeding mechanism, and correspondingly, either the attachment-engaging portions or the fixed shafts are connected to the immovable part or base.

The apparatus of the present invention will thus operate in such a manner that the rotating cylinder causes the crosswise feeding mechanism to move up and down relative to the immovable part or base.

The resistance unit installed in the cylinder of the apparatus provided herein will exert resistance against rotation of said cylinder. Thus, the cylinder is not so easily forced to rotate as would render it shaky.

The lift device provided herein from another aspect does comprise a cylinder, lids closing opposite ends of the cylinder, fixed shafts protruding outwards and longitudinally of the cylinder that is coaxial with said shafts capable of rotating relative to said lids, a motor built in and driving the cylinder to rotate around and relative to the fixed shafts, a reducer built in the cylinder so as to reduce the motor's rotational speed transmitted thereto, and a resistance unit also built in the cylinder and increasing resistance against rotation of said cylinder, wherein attachment-engaging portions are formed on the respective lids and disposed longitudinally of the cylinder to face outwards so that the attachment-engaging portions and the cylinder do rotate together in unison with each other, the attachment-engaging portions having axes arranged offset with respect to axes of the fixed shafts.

The lift device of this structure uses the resistance unit installed in the cylinder so that resistance will always be applied thereto, thereby rendering it less shaky against any unintentional external force. The number of parts or members required to construct the lift device will be decreased, since the attachment-engaging portions are formed on and integral with the lids.

BEST MODES OF CARRYING OUT THE INVENTION

FIGS. 1 to 12 show a transverse conveyance apparatus 1 and constituent members or parts thereof, all provided herein. The apparatus 1 may be used as a cross-feeder in any conveyor line of the roller conveyor type, and substantially consists of a crosswise feeding mechanism 2 and a lift device 3.

Figure 5:
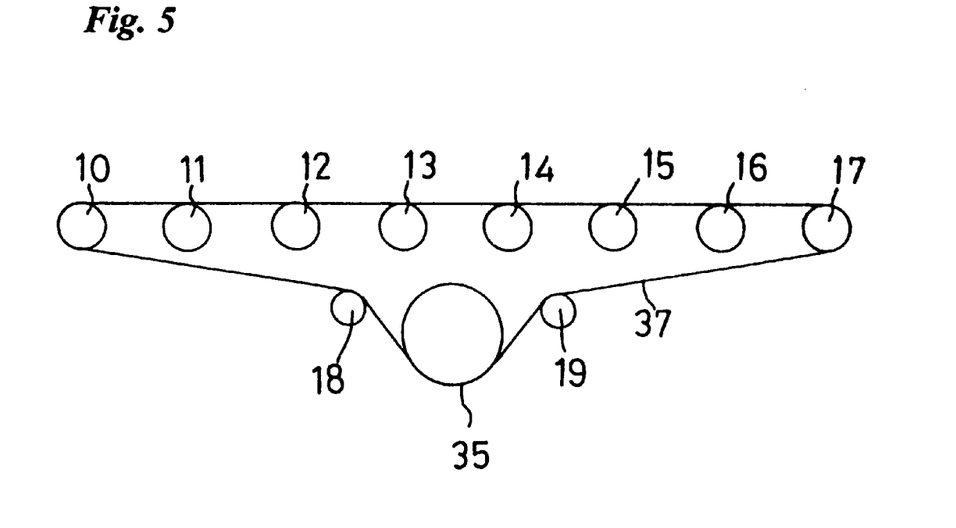
FIG. 5 schematically shows the arrangement of pulleys that are used in a crosswise feeding mechanism built in the apparatus of FIG. 1.

Details of the apparatus are as follows. The crosswise feeding mechanism 2 comprises five pairs of parallel plates 7 and 8. Ten pulleys 10 to 19 are interposed between the plates 7 and 8 facing one another in each pair, as shown in FIG. 5.

One of the plates 7 is identical with the other 8, and they are generally 'bands' in their shape. A lower middle portion of each of those plates 7 and 8 is formed as a protrusion 20. An arc-shaped recess 21 is cut out in each protrusions 20.

The ten pulleys 10 to 19 as rotating portions are held in position between the plates 7 and 8 facing one another. Each pulley 10–19 is a V-pulley. All the pulleys 10–19 are freely rotatable idle pulleys. As seen in FIG. 5, those pulleys are arranged such that eight upper ones 10–17 form a row, with the two remaining ones 18 and 19 are positioned near the protrusions 20 in each pair of the plates 7 and 8.

Figure 1:
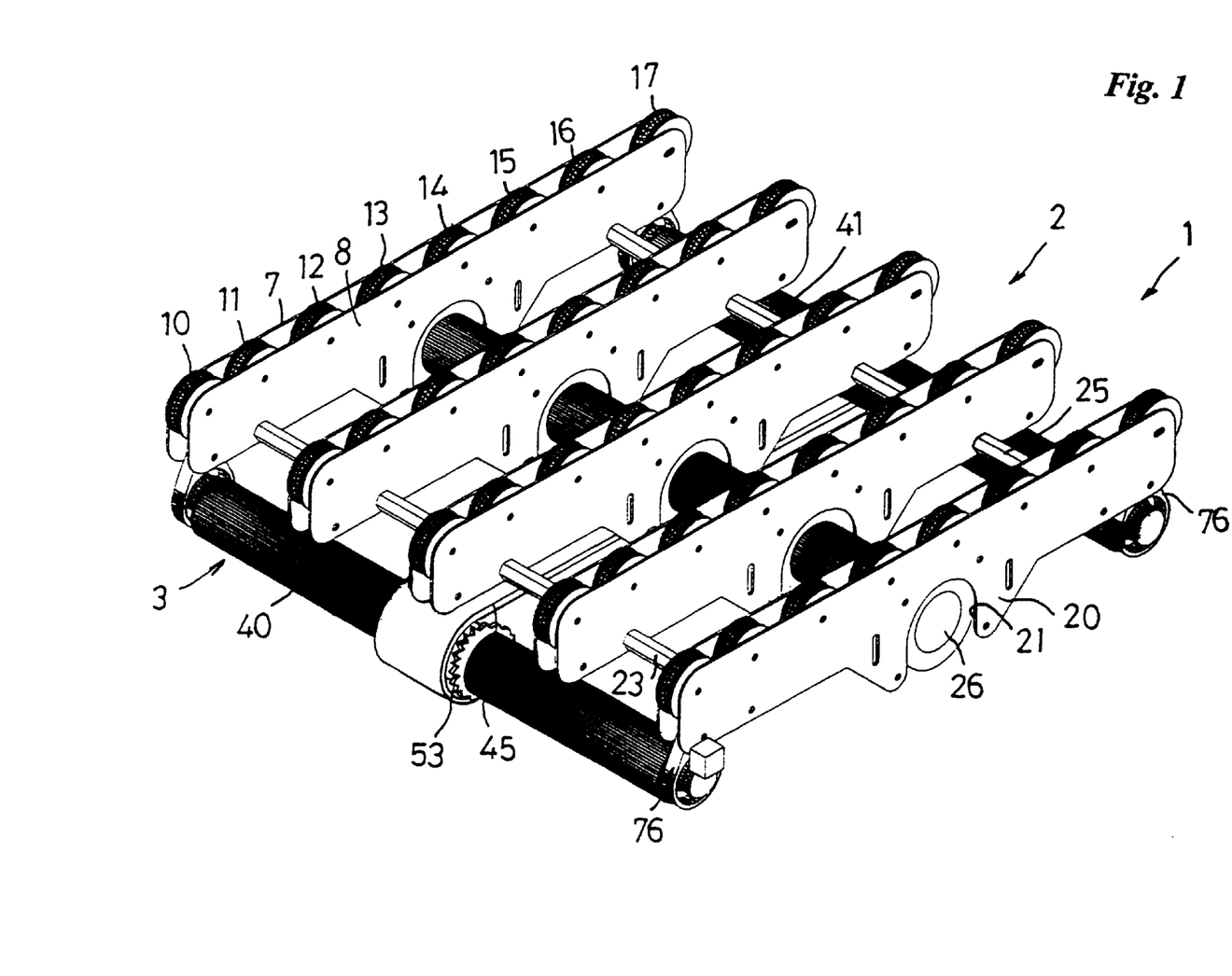
FIG. 1 is a perspective view of a transverse conveyance apparatus provided in an embodiment of the present invention, the apparatus having V-belts not shown.
Figure 2:
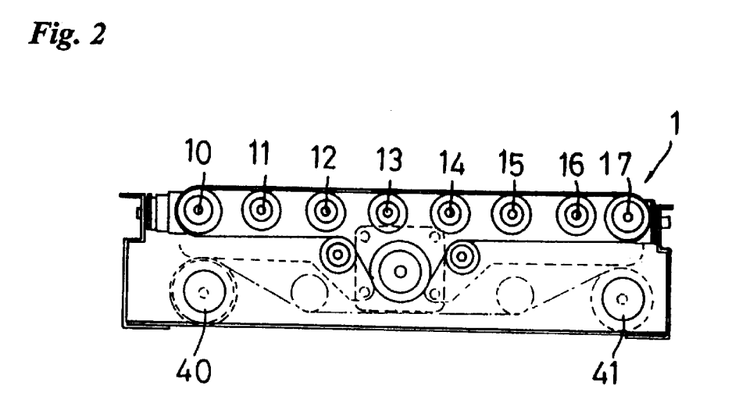
FIG. 2 is a front elevation of the apparatus shown in FIG. 1.
Figure 12:
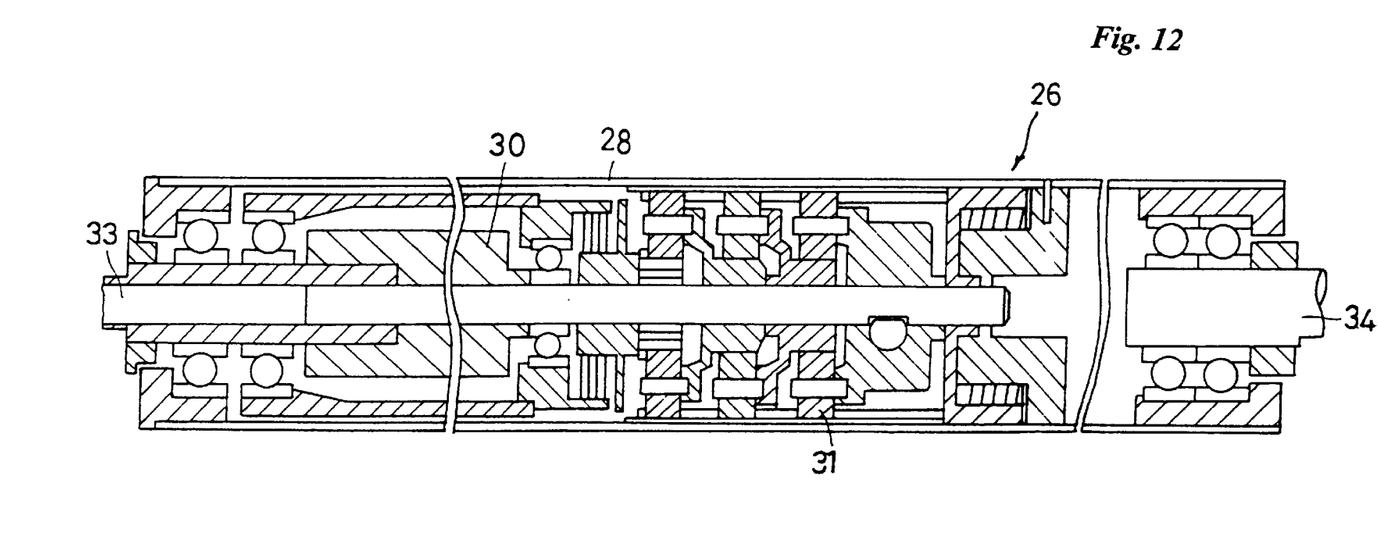
FIG. 12 is a cross section of a motor-installed roller as one of principal parts of the crosswise feeding mechanism.

As shown in FIG. 1, two hexagonal rods 23 and 25 penetrate the plates 7 and 8 to render the five pairs thereof integral with each other. A motor-installed roller 26 for transversely transporting articles does extend through the recesses 21. The motor-installed roller 26 in this embodiment typically consists of a cylinder 28, the motor 30 and a reducer 31 composed of a series of planetary gears. The motor 30 and the reducer 31 are built in the cylinder 28, as seen in FIG. 12.

Fixed shafts 33 and 34 protruding sideways from the cylinder 28 remains stationary not rotating at all. If the motor 30 is turned on, then its torque will be transmitted by the reducer 31 to the roller body, viz., cylinder 28. The motor 30 thus activated will cause the external cylinder 28 to rotate at a reduced speed.

V-pulleys 35 (see FIG. 5) are fixed on the roller's 26 circumferential zones that are each interposed between the plates 7 and 8.

A V-belt 37 (not shown in FIG. 1) extends around each group of the pulleys 10–19 and the V-pulley 35 of the motor-installed roller 26, all of these pulleys being sandwiched by and between the plates 7 and 8.

The lift device 3 is composed of a lifting roller 40 (as a main part of the lift device) having a motor installed therein, in addition to an idle roller 41 and a toothed belt 45.

The motor-installed roller 40 as the main part of the lift device is one of the most characteristic features in the present invention.

Similarly to the known motor-installed rollers, the lifting motor-installed roller 40 comprise a cylinder 50 and a motor 51 and a reducer 52, which are both built in the cylinder 50, so that rotational speed of the motor will be reduced and then transmitted to the cylinder 50. Fixed shafts 55 and 56 jutting from the cylinder 50 of the roller 40 also remains stationary not rotating at all. A torque from the motor 51 will be transmitted to the cylinder 50 through the reducer 52. Thus, with the motor 51 being turned on, the external cylinder 50 will rotate at a decreased speed.

Distinctive over the feeding motor-installed roller 26, the lifting roller 40 has an integral pulley 53 on the outer surface of the cylinder 50 engaging with the toothed belt. The reducer in this motor-installed roller 40 for lifting the crosswise feeding mechanism has a reduction ratio extremely high and for example of about 150:1. A frictional resistance unit 60 is built in the motor-installed roller 40 so as to stabilize the lift device 3 in all positions thereof. Furthermore, lids 70 and 71 of this roller 40 are of a remarkably peculiar shape.

As shown in FIG. 1, the pulley 53 for the toothed belt is fixedly attached to a middle portion of the cylinder 50. As will be seen in FIG. 7, the roller 40 comprises four sequential trains of planetary gears to afford the very high reduction ratio.

The lifting motor-installed roller 40 has in its interior the frictional resistance unit 60. As seen in FIG. 7–10, this resistance unit 60 consists of a braking shoe 61, a spring 63 and a seat 62 for the spring.

The braking shoe 61 included in the resistance unit 60 is formed of a plastics to have an arc-shaped end face 65 and a cavity 66.

The spring seat 62 also has a cavity 67. Such a seat 62 is formed integral with a central or sun gear 69 of the planetary gears, which is coaxial with the roller 40 so that said seat will rotate at a reduced speed. In more detail, the rotational speed of the spring seat 62 noticeably differs from that at which the roller's 40 cylinder 50 does rotate. The spring 63 is held in between the cavity 67 of seat 62 and the cavity 66 of braking shoe 61. The end face of the braking shoe 61 is kept in a sliding contact with a collar 59 that is disposed on and integral with an inner periphery of the cylinder 50 so as to rotate in unison therewith.

The spring 63 always urges the end face of the braking shoe 61 onto the collar 59 fixed on the cylinder's inner periphery.

The cylinder 50 has openings at its opposite ends, and those openings are closed with the lids 70 and 71. One of bearings 72 intervenes between the lid 70 and the shaft 55, with the other bearing 73 intervening between the other lid 71 and the other shaft 56. Therefore, these lids 70 and 71 will rotate together with the cylinder 50 around the fixed shafts 55 and 56, respectively.

Figure 6:
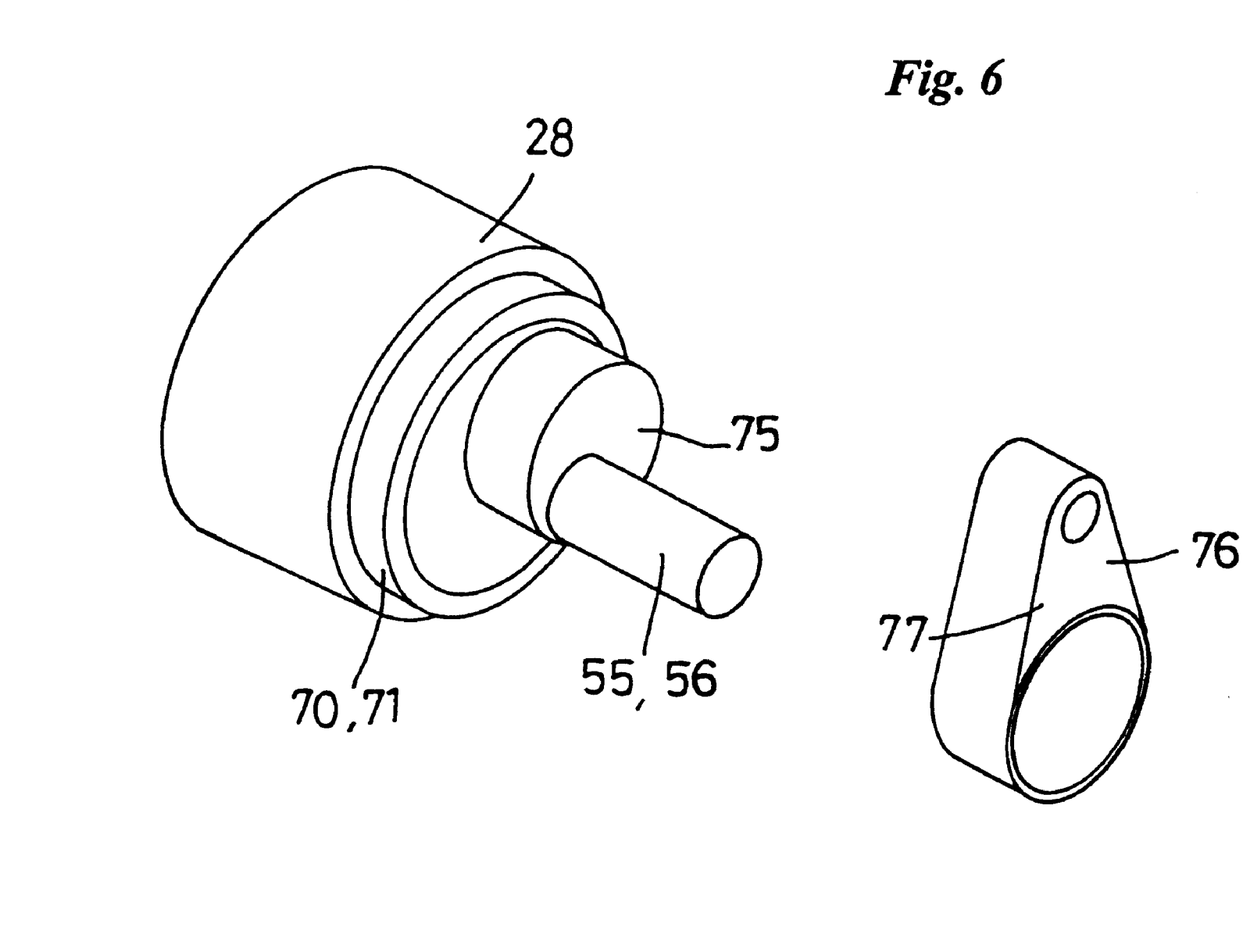
FIG. 6 is a perspective view of a lift device that is employed in the present invention, the device being shown in part at one of its ends.
Figure 7:
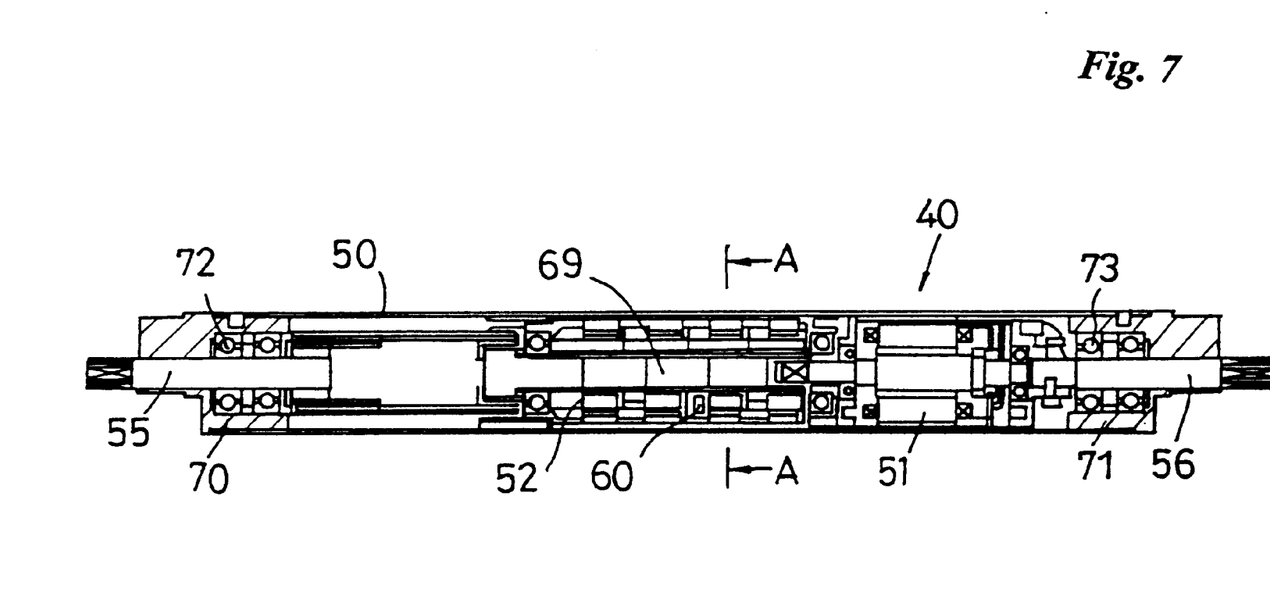
FIG. 7 is a cross section of the lift device's one end shown in FIG. 6.
Figure 8:
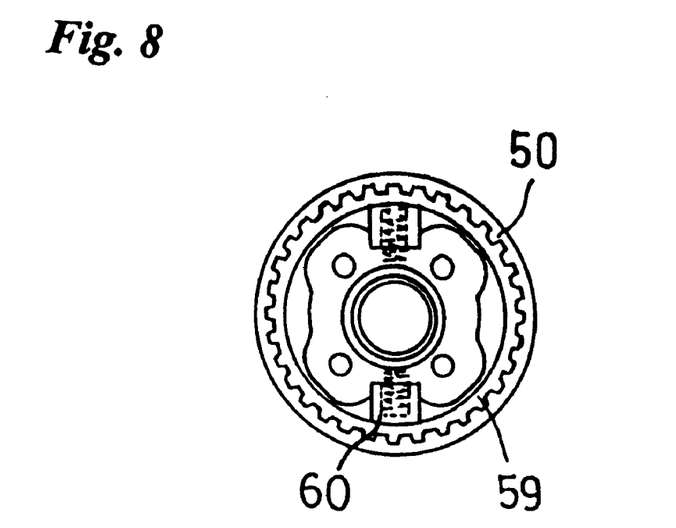
FIG. 8 is a cross section taken along the line A—A in FIG. 7.
Figure 9:
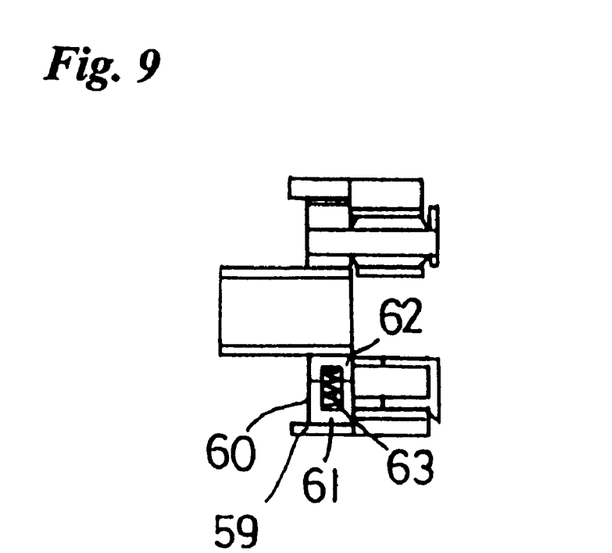
FIG. 9 is a front elevation of a resistance unit that is built in the lift device of the present invention.
Figure 10:
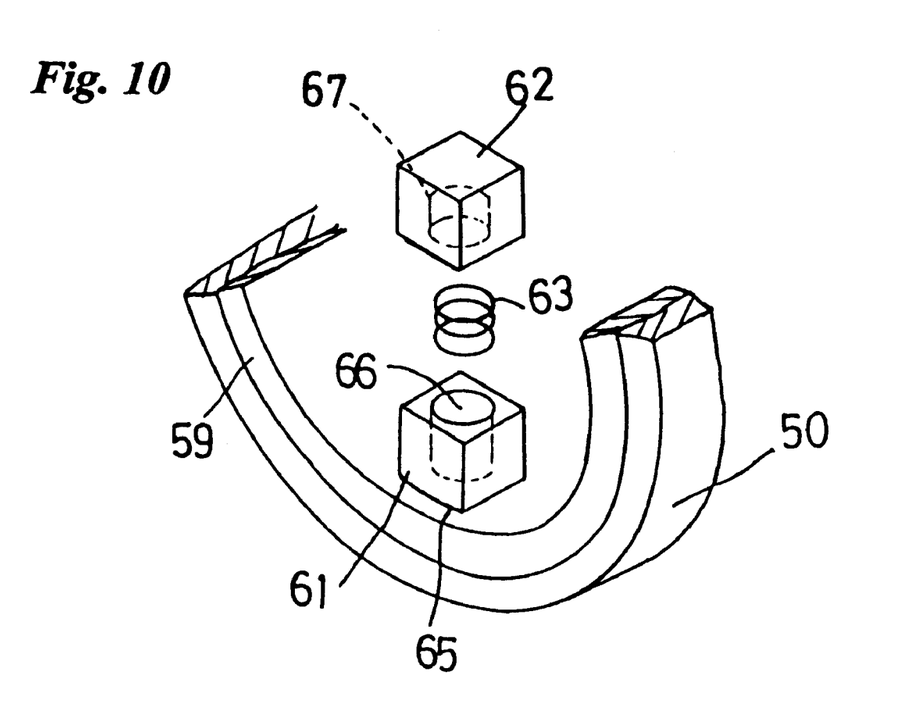
FIG. 10 is a perspective view of the resistance unit shown in FIG. 9.

The lids 70 and 71 of the peculiar shape have an offset configuration as shown in FIG. 6. Each lid has a section fitting in the cylinder 50 and another section protruding therefrom. A short columnar lug 75 (as the 'attachment-engaging portion' noted above) is formed on the latter section of each lid such that a center of said lug lies eccentric from the bore for the corresponding shaft 55 or 56.

A link 76 (as the "attachment" often mentioned above) is connected at one of its opposite ends to and held on each columnar lug 75. The one end of this link 76 comprising a connecting body 77 as shown in FIGS. 1 and 6 can freely slide around the columnar lug 75 continuously rotating relative to said link, due to a bearing interposed between them.

The idle roller 41 of the same outer configuration as the lifting roller 40 has however not any motor, any reducer or any resistance unit installed therein.

Figure 11:
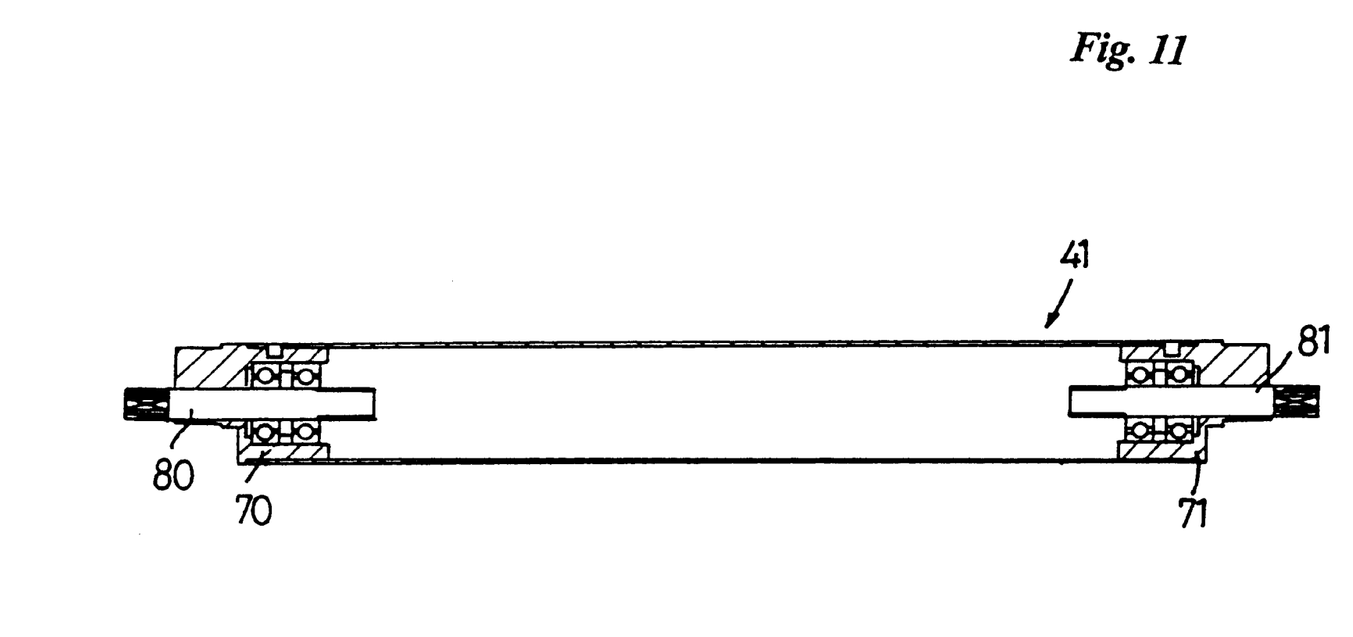
FIG. 11 is a cross section of an idle or indirectly driven roller also constituting the lift device.

FIG. 11 shows this idle and empty roller 41, wherein it has at its middle region a toothed pulley, and its lids 70 and 71 also have columnar lugs engaging with other links 76.

The fixed shafts 55 and 56 of the lifting roller 40 as well as other fixed shafts 80 and 81 of the idle roller 41 are all immovably secured to a base that is not shown. The connecting bodies 77 of the links 76 are connected at the other ends thereof to the crosswise feeding mechanism 2 described above.

The toothed belt 45 spanned over and between the motor-installed roller 40 and the idle roller 41 will force the latter roller to rotate synchronously with the former.

Figure 3:
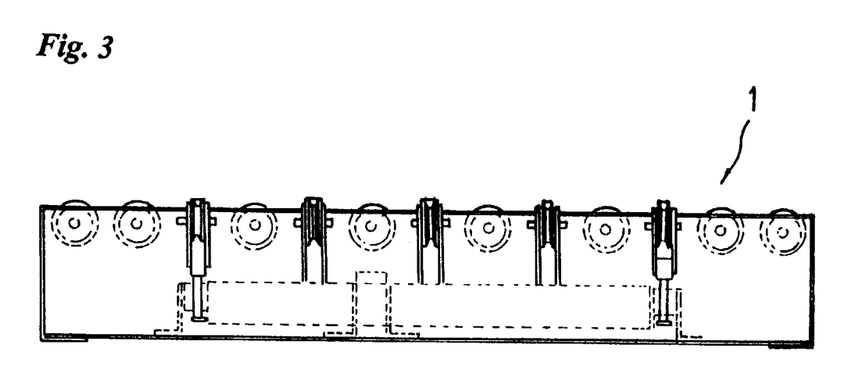
FIG. 3 is a plan view of the apparatus shown in FIG. 1.
Figure 4:
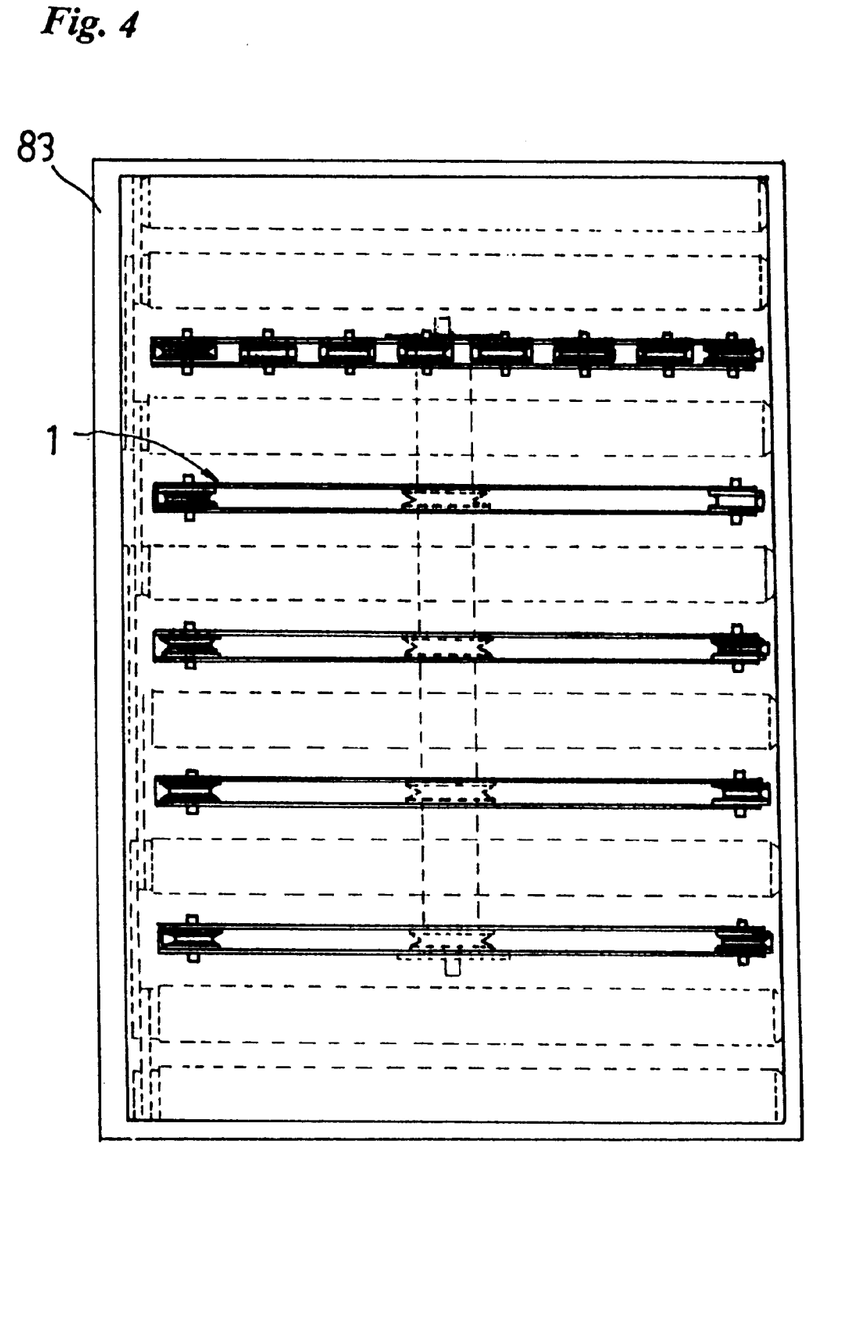
FIG. 4 is a left side elevation of the apparatus shown in FIG. 1.

As seen in FIGS. 3, 4 and 5, the transverse conveyance apparatus 1 of this embodiment may be built in a lengthwise-feeding conveyor line 83. This conveyor line 83 comprises a single frame holding in position a plurality of rollers including that which has motor therein, as illustrated by dash-and-double-dots in FIG. 3. A desired area of this conveyor line 83 is constructed such that five greater gaps are provided each between the two adjacent rollers, whereby the respective groups of pulleys in the transverse conveyance apparatus 1 are placed in the respective gaps.

In operation of this apparatus 1, the columnar lugs 75 (i.e., the attachment-engaging portions) of the motor-installed lifting roller 40 will normally stand still, taking their lowest position.

This means that the crosswise feeding mechanism 2 of the transverse conveyance apparatus 1 normally remains lowered so that each group of the pulleys 10–17 and the V-belt 37 are kept at their 'sunk' position between the neighboring rollers of the conveyor line 83. In this state, the articles having been transported on and along the conveyor line 83 can smoothly flow towards a downstream region of said line, without becoming jammed with the crosswise feeding mechanism 2.

Once a sensor not shown detects that some special ones of the articles have arrived at a station where the sensor and the transverse conveyance apparatus 1 are located, a stopper not shown will immediately jut above the line so as to stop the special articles to lie stationary and exactly above said apparatus. Subsequent to such a change in state of the system, the lifting motor-installed roller 40 will be turned on to rotate in one direction about 180 degrees. The roller 40 will continue to rotate until the attachment-engaging portions 75 of the lids 70 and 71 take their position just above the axis of said roller, which will then be turned off.

In this connection, a limit switch not shown may be incorporated in the motor-installed roller 40. This switch will be turned over to its 'OFF' position so as to stop this roller, immediately after the cylinder 50 as the main body of said roller has rotated the predetermined angle.

The lifting roller 40 will thus rotate about 180 degrees causing the attachment-engaging portions 75 of the lids 70 and 71 to stand exactly above said roller's axis. If the roller 40 is subsequently stopped in a manner just described above, then the crosswise feeding mechanism 2 of the apparatus 1 will be at its raised position where the back face of the V-belt 37 protrudes up above the tops of the parallel rollers constituting the conveyor line 83.

It is to be noted here that in the apparatus 1 of the present invention the braking shoe 61 of the frictional resistance unit 60 is always urged onto the inner periphery of the cylinder 50 of motor-installed roller 40. By virtue of this feature, this cylinder's inner periphery will be kept in a frictional contact with said shoe 61 even after the roller 40 has temporarily been stopped not to rotate. The cylinder 50 is protected in this way from any unintentional excessive rotation and from any shaking motion, so that the crosswise feeding mechanism 2 remains stabilized above a plane in which the tops of the conveyor line's rollers are included.

Then, the crosswise feeding mechanism 2 of the apparatus 1 will push up the special articles off the rollers of the conveyor line 83.

Subsequently, the feeding motor-installed roller 26 will be switched on to turn around its axis in order to drive all the V-belts 37 engaging with this roller to rotate in a synchronous manner. Those articles are transferred sideways in this manner to be taken out of said conveyor line 83.

Upon finish of such a delivering operation deflecting the articles from the conveyor line 83, the lifting motor-installed roller 40 will be turned on to rotate again in the same direction as that mentioned above. With the columnar lugs (viz., attachment-engaging portions) 75 having reached their lowest position, the roller 40 will be turned off so that the crosswise feeding mechanism 2 sinks to take its home position below the conveyor line 83.

As described above, the present embodiment employs those V-belts less likely to run in any meandering manner when transporting the articles sideways. Though the crosswise feeding V-belts are preferable, the present invention is not necessarily delimited to the crosswise feeding V-belts, but they may be replaced with any other known flat belts or toothed belts.

A rubber piece or the like member may substitute for the coiled spring used in the embodiment, for urging each braking shoe 61 towards the cylinder. This shoe is kept in a 'point' contact with a small area of the cylinder's inner periphery in the embodiment. However, a mass of a rubber or any other appropriate elastic material may be fixed around a central shaft and compressed within and by the cylinder so as to provide an alternative frictional resistance unit.

Although the spring seats 62 are set integral with the sun gear 69 in the embodiment, they may alternatively be secured to the fixed shafts.

In the foregoing description on the operation of the embodiment, the stopper protruding up through the conveyor line 83 is exemplified as the means for stopping and holding the articles exactly above the transverse conveyance apparatus 1. This fashion is most popular and widely adopted in the field, although a plurality of motor-installed rollers may be used as an alternative drive source as a whole among the idle rollers constituting the conveyor line. In such an alternative case, each driven roller alternate with some idle rollers, and the former roller(s) located on or near the apparatus 1 will need only be turned off so that the articles lose their inertia and are positioned on said apparatus in a simpler and surer manner.

In summary, the transverse conveyance apparatus for roller conveyors comprise a frame, a crosswise feeding mechanism mounted to the frame and a lift device for raising and lowering the frame. The crosswise feeding mechanism has rotating portions, each of which is of a width freely movable through between two adjacent rollers of the conveyor, so that articles are fed to or transferred from the conveyor crosswise relative to the lengthwise transporting direction thereof The lift device comprises a cylinder, lids closing its opposite ends, outwardly and longitudinally protruding fixed shafts that are rotatable relative to the lids and coaxial with the cylinder, and a motor built in and driving the cylinder to rotate around the fixed shafts. The device further comprises a reducer incorporated in the cylinder so as to reduce the motor's rotational speed transmitted to the cylinder, and a resistance unit also built in the cylinder and increasing resistance against rotation thereof. Attachment-engaging portions formed on the lids extend longitudinally of the cylinder so that these portions having axes arranged offset from axes of the fixed shafts do rotate along with the cylinder. The fixed shafts are connected to the crosswise feeding mechanism, with the attachment-engaging portions being rotatably connected to the immovable part, or alternatively said shafts connected to this part and said portions to that body.

The transverse conveyance apparatus of the present invention, which utilizes a part similar to the prior art motor-installed roller, is therefore rendered compact.

The lids of the cylinder in the transverse conveyance apparatus have the attachment-engaging portions rotating in unison with the cylinder and preferably located outside it. Either the fixed shafts or these engaging portions are connected to the crosswise feeding mechanism, and on the contrary, either these portions or the fixed shafts are connected to the immovable part or base.

The apparatus will thus operate in such a manner that the rotating cylinder causes the crosswise feeding mechanism to move up and down relative to the immovable part or base as the attachment-engaging portions rotated with the cylinder.

The resistance unit installed in the cylinder of the apparatus provided herein will exert resistance against rotation of said cylinder, whereby the cylinder is less likely to unintentionally rotate and less shaky.

The attachment-engaging portions used in the apparatus of the invention are either of a columnar or of a cylindrical shape. The links rotatably engage at one ends thereof with those portions to slide thereabout or therein. Thus, said links operatively connect the lift device to the crosswise feeding mechanism, with the fixed shafts being secured to the immovable part. Those attachment-engaging portions in the present invention may either be protrusions or recesses.

As the crosswise feeding mechanism's cylinder having those round attachments is driven to rotate 360 degrees, all the links will rise and then descend at their other ends without any fear of interfering with or colliding with the cylinder. By virtue of this prominent feature, the cylinder need to rotate only in one direction when raising or lowering the crosswise feeding mechanism, thereby protecting the constituent members from any uneven abrasion inherent in the prior art. Rotation by 360 degrees of the cylinder enables said feeding mechanism to ascend or descend by a vertical distance substantially equal to height or radius of said cylinder.

The resistance unit in the apparatus provided herein comprises a member that may be of a brake shoe-like shape and in a sliding contact with the inner periphery of the cylinder included in the lift device. More preferably, the resistance unit may consists of the braking shoe and a biasing member always urging same onto the cylinder's inner periphery or onto any additional member integral with and rotating synchronously therewith.

This feature is advantageous in that a constant frictional resistance will be imparted to the cylinder to thereby protect the crosswise feeding mechanism from any shaking motion that would impair positional stability thereof.

What is claimed is:

1. A transverse conveyance apparatus for roller conveyors comprising a frame, a crosswise feeding mechanism mounted to the frame and a lift device for raising and lowering the frame, wherein the crosswise feeding mechanism has rotating portions, each of which is of a width freely movable through between two adjacent rollers of the conveyor, so that articles are transported in a direction crossing that in which the articles are to advance on and along the roller conveyor, wherein the lift device comprises a cylinder, lids closing opposite ends of the cylinder, fixed shafts protruding outwards and longitudinally of the cylinder that is coaxial with said shafts capable of rotating relative to the lids, a motor that is built in the cylinder and drives it to rotate around and relative to the fixed shafts, a reducer built in the cylinder so as to reduce the motor's rotational speed transmitted thereto, and a resistance unit also built in the cylinder and increasing resistance against rotation of said cylinder, wherein attachment-engaging portions are formed on the respective lids and disposed longitudinally of the cylinder to face outwards so that the attachment-engaging portions and the cylinder do rotate together in unison with each other, the attachment-engaging portions having axes arranged offset with respect to axes of the fixed shafts, and wherein the fixed shafts are held in position in and by one member selected from the group consisting of the frame of the crosswise feeding mechanism and an immovable part, with the attachment-engaging portions being not only connected to the other member selected from said group but also capable of rotating relative to said other member.

2. A transverse conveyance apparatus for roller conveyors as defined in claim 1, wherein each attachment-engaging portion is a columnar lug.

3. A transverse conveyance apparatus for roller conveyors as defined in claim 2, wherein a link fits at one of opposite ends thereof on an outer periphery of the columnar lug so as to be capable of rotating relative to said lug and to operatively connect the lift device to the frame of the crosswise feeding mechanism, with the fixed shafts being connected to the immovable part.

4. A transverse conveyance apparatus for roller conveyors as defined in claim 1, wherein each attachment-engaging portion is a cylindrical recess.

5. A transverse conveyance apparatus for roller conveyors as defined in claim 4, wherein a link fits at one of opposite ends thereof in the cylindrical recess so as to be capable of rotating relative to said recess and operatively connect the lift device to the crosswise feeding mechanism, with the fixed shafts being connected to the immovable part.

6. A transverse conveyance apparatus for roller conveyors as defined in claim 1, wherein the resistance unit comprises a braking shoe kept in a sliding contact with the cylinder.

7. A transverse conveyance apparatus for roller conveyors as defined in claim 1, wherein the brake unit comprises a braking shoe and a biasing member for urging the shoe towards one of an inner periphery of the cylinder and an additional member rotating synchronously therewith.

8. A lift device comprising: a cylinder, lids closing opposite ends of the cylinder, fixed shafts protruding outwards and longitudinally of the cylinder that is coaxial with said shafts capable of rotating relative to said lids, a motor that is built in the cylinder and drives it to rotate around and relative to the fixed shafts, a reducer built in the cylinder so as to reduce the motor's rotational speed transmitted thereto, and a resistance unit also built in the cylinder and increasing resistance against rotation of said cylinder, wherein attachment-engaging portions are formed on the respective lids and disposed longitudinally the cylinder to face outwards so that the attachment-engaging portions and the cylinder do rotate together in unison with each other, the attachment-engaging portions having axes arranged offset with respect to axes of the fixed shafts.

9. A lift device as defined in claim 8, wherein each attachment-engaging portion is a columnar lug.

10. A lift device as defined in claim 9, wherein a link is fitted at one of opposite ends thereof on an outer periphery of the columnar lug so as to be capable of rotating relative to said link and to pivotally connect the lift device to a foreign object that is to be raised and lowered.

11. A lift device as defined in claim 8, wherein each attachment-engaging portion is a cylindrical recess.

12. A lift device as defined in claim 8, wherein the resistance unit comprises a braking shoe kept in a sliding contact with the cylinder.

13. A lift device as defined in claim 8, wherein the resistance unit comprises a braking shoe and a biasing member for urging the shoe towards one of an inner periphery of the cylinder and an additional member rotating synchronously therewith.

14. A lift device comprising: a cylinder, lids closing opposite ends of the cylinder, fixed shafts protruding outwards and longitudinally of the cylinder that is coaxial with said shafts capable of rotating relative to said lids, a motor built in and driving the cylinder to rotate around and relative to the fixed shafts, and a reducer built in the cylinder so as to reduce the motor's rotational speed transmitted thereto, wherein attachment-engaging portions are formed on the respective lids and disposed longitudinally of the cylinder to face outwards so that the attachment-engaging portions and the cylinder do rotate together in unison with each other, the attachment-engaging portions having axes arranged eccentric with respect to the fixed shafts.

* * * * *